United States Patent [19]
Ishikawa et al.

[11] Patent Number: 5,967,637
[45] Date of Patent: Oct. 19, 1999

[54] TAPERED LIGHT GUIDE PLATE FOR SURFACE LIGHT SOURCE DEVICE AND METHOD OF MAKING BY INJECTION MOLDING VIA SUPPLEMENTARY CAVITY

[75] Inventors: Tsuyoshi Ishikawa, Tokyo; Hiroshi Yamazaki, Higashimatsuyama, both of Japan

[73] Assignee: Enplas Corporation, Kawaguchi, Japan

[21] Appl. No.: 08/520,648

[22] Filed: Aug. 29, 1995

[30] Foreign Application Priority Data

Aug. 29, 1994 [JP] Japan ..................................... 6-203624

[51] Int. Cl.⁶ ................................ F21Y 7/04; G02B 6/10
[52] U.S. Cl. .............................. 362/31; 362/26; 385/146; 385/901; 264/1.1; 264/1.24; 264/5
[58] Field of Search ......................... 362/31, 26; 385/146, 385/901; 264/1.1, 1.24, 5

[56] References Cited

U.S. PATENT DOCUMENTS

| | | | |
|---|---|---|---|
| 5,499,165 | 3/1996 | Holmes, Jr. | ................................ 362/31 |
| 5,550,676 | 8/1996 | Ohe et al. | ................................ 359/599 |

FOREIGN PATENT DOCUMENTS

| | | |
|---|---|---|
| 3-59526 | 3/1991 | Japan . |
| 3-104906 | 10/1991 | Japan . |
| 5-75738 | 10/1993 | Japan . |
| 5-75739 | 10/1993 | Japan . |

*Primary Examiner*—Sandra O'Shea
*Assistant Examiner*—Ronald E. DelGizzi
*Attorney, Agent, or Firm*—Staas & Halsey

[57] ABSTRACT

There is provided a very thin light guide plate for a surface light source device and a method of manufacturing it without the use of high-precision molding machine. A surface light source device using this light guide plate generates outgoing light having high uniformity. According to the manufacturing method, a light guide plate free from a weld line or warp can be manufactured with good transferring characteristics. The light guide plate is thick on an incident surface 1 side and thin on a lower surface 4 side. At the central portion of an incident surface 1 in a longitudinal direction, a projecting portion obtained by cutting an overhang portion 7 at a position a distance D apart from the incident surface 1 is formed. The cut surface of the projecting portion is not made specular and is kept rough. In molding of the light guide plate, a molten material is supplied from the position of a gate mark 9. After molding, the overhang portion 7 is cut off by an ordinary cutter, thereby obtaining a light guide plate.

14 Claims, 6 Drawing Sheets

TAPERED LIGHT GUIDE PLATE FOR SURFACE LIGHT SOURCE DEVICE AND METHOD OF MAKING BY INJECTION MOLDING VIA SUPPLEMENTARY CAVITY

BACKGROUND OF THE INVENTION

1. Field of the Invention

The present invention relates to a light guide plate for surface light source device and a method of manufacturing it and, more particularly, a light guide plate for a surface light source device used as a backlight for a liquid crystal display for OA equipment, a television set, a measuring instrument, a watch, or the like, and a method of the light guide plate by injection molding.

2. Description of Related Art

A surface light source device is well known. A small surface light source device is used as a backlight for a liquid crystal display wristwatch, and a large surface light source device is used as a backlight for an advertising display panel or an illumination device for a show window. An LED is used as the light source for the small device, and a fluorescent tube is used as the light source for the large device. As a light guide plate, an acrylic plate cut so as to have a proper dimension is used.

Since a surface light source device is required to have a small thickness and to cause a predetermined plane to emit uniform light, a light source is generally arranged at a lateral position of the light guide plate. For this reason, the light guide plate has been subject to various processings which include shaping to a special shape, surface roughening with sandpaper, special tool or apparatus and polishing of incident surface to making it specular.

In recent years, with epochmaking progress of a liquid crystal display technique and development of OA equipment, electronic-communication equipment, or the like, demand for a surface light source device used in a liquid crystal display device having a size of about 10 inches steeply increases. As a light source arranged at a lateral position of a light guide plate, a long-life extremely slender fluorescent tube having a diameter of 4 mm or less is developed. Light guide plates have come to be manufactured by injection molding which has a small number of steps and provides mass-production of light guide plates with stable quality.

A light guide plate used in a surface light source device is required to be variously improved to make it possible that a plane having a designed area emits source light guided in a latitudinal direction as uniform plane light. Various proposals associated with the improvements have been made. Almost all the various proposals use one of the following techniques: a technique in which a surface opposing the emission surface, i.e., a reflecting surface, is processed (formation of an uneven surface, coating, or printing) by some means to modify its reflectance distribution; a technique in which a reflecting surface is arranged not parallel to an emission surface, but formed by various planes and curves; and a technique obtained by combining both the above techniques to each other.

In these techniques, a light guide plate having a reflecting surface not parallel to the emission surface is thick at the incident surface for source light or near the incident surface and thin at positions distant from the incident surface. Such light guide plates are disclosed in Japanese Patent Laid-open No. 3-59526, Japanese Utility Model Laid-open No. 3-104906, Japanese Utility Model Laid-open No. 5-75738, or Japanese Utility Model Laid-open No. 5-75739, and in FIG. 7, FIG. 8. FIGS. 7 and 8 are side views showing light guide plates. Referring to FIGS. 7 and 8, each upper surface is the incident surface, and each left surface is the emission surface. The present invention relates to a light guide plate having a shape as shown in FIG. 7 or 8 and to an improvement of a method of manufacturing the light guide plate.

A conventional method of molding a light guide plate is described here with reference to a light guide plate having a typical shape shown in FIGS. 9 and 10. FIG. 9 is a plan view showing the light guide plate when viewed from the emission surface side, and FIG. 10 is a right-side view of FIG. 9. Therefore, referring to FIGS. 9 and 10, an upper surface is the incident surface 1 which is perpendicular to the emission surface 2 in FIG. 10. Since a fluorescent tube is arranged in the longitudinal direction of the incident surface at a position outside and near the incident surface, the thickness of the light guide plate is defined in consideration of the diameter of the fluorescent tube.

A reflecting surface 3 is obliquely formed with respect to the emission surface 2 so that the reflecting surface 3 can directly reflect incident light from the incident surface 1. Thus, the thickness of the guide plate gradually decreases downward in FIGS. 9 and 10.

When the light guide plate is to be formed by injection molding, a specific position on a specific surface for a gate (opening through which molten material is injected into a mold cavity) of the mold must be determined. Since the light guide plate is used in a surface light source device, the gate position is determined in consideration of the utilization efficiency of light, uniform emission from a large emission surface, profitability and so on. Judging from this point of view, it is conventionally assumed that the incident surface should be specular to efficiently receive source light. In addition, all the surface should be specular to obtain uniform outgoing light.

According to conventional understanding, a gate arranged on the incident surface provides an increase in cost because the incident surface must be made specular by high-accuracy polishing or buff finish serving as post-processing. Therefore, such arrangement of gate on the incident surface has not been employed.

The emission and reflecting surfaces generally must have effective areas as large as possible. In addition, in order to obtain uniform outgoing light, an uneven surface having a variety of shapes such as a net-like pattern is often formed on the reflecting surface, otherwise coating or printing is often applied to the reflecting surface. Therefore, it has been avoided to arrange a gate on these surfaces.

Referring to FIGS. 9 and 10, a gate may be arranged on the lower surface 4. However, the light guide plate has a very small thickness at lower surface 4. For example, an ultra-thin light guide plate for office Automation ("OA") equipment having a size of about 10 inches used, the thickness at the lower surface is about 1 to 2 mm, and a gate can hardly be arranged on the lower surface. Even if a gate is arranged on the lower surface, a sufficient injection pressure cannot be obtained by a general molding machine, an acrylic molten material cannot be preferably injected into the cavity. Thus, transferring characteristics are considerably degraded.

In order to increase the injection pressure, or increase the temperature of the mold to make the flow of the material easy, a highly expensive molding machine of high-accuracy control is required. For this reason, the cost of the light guide plate inevitably increases. Furthermore, the number of gates may be increased. In this case, however, the cost of the mold increases and a so-called weld line is inevitably formed, leading to a fatal problem for uniform outgoing light. Therefore, it is not practical to arrange a gate on the lower surface.

For these reasons, a gate is conventionally arranged at a position on one of side surfaces 5 and 6 in FIG. 9, in particular, in the thick portion near the incident surface. Similarly, the above arrangement is employed in molding for a two-light light guide plate in which the inclination direction of the reflecting surface 3 with respect to the emission surface 2 is reversed at the central portion of the reflecting surface 3, the lower surface 4 has a thickness almost equal to that of the incident surface 1 so that another fluorescent tube is arranged outside and near the lower surface 4, as shown in FIG. 11.

However, according to a conventional molding method, as shown in FIG. 9, if a gate G is arranged on the side surface 5, the material quickly flows in a flow path A, but slowly flows in a flow path B at injection. Thus, the material does not uniformly flow from the incident surface 1 to the lower surface 4 and the flow varies depending on the position. In addition, the flow on the side surface 5 is considerably different from the flow on the side surface 6. For this reason, the pressure difference and temperature difference between regions fall into disorder.

As a result, in particular, when an uneven surface having a variety of shapes is formed on the reflecting surface, the shape of the uneven surface cannot be desirably transferred. In addition, problems such as formation of an weld line and warp after molding arise easily. In the ultra-thin light guide plate as shown in FIGS. 9 and 10, since a material cannot completely filled in a cavity by molding machine and an ordinary molding method, a troublesome examination must be performed for conditions set for molding processing at every slight change in shape of the light guide plate.

OBJECT AND SUMMARY OF THE INVENTION

It is an object of the present invention to provide a light guide plate for a surface light source device, which can be manufactured easily by using a ordinary molding machine on the basis of ordinary conditions and a method of manufacturing it.

In order to achieve the above object, in a light guide plate which is manufactured by injection molding and has an incident surface in the longitudinal direction of a slender beam, a large thickness near the incident surface, a thickness decreasing as distant therefrom, and an emission surface for emitting incident light from the incident surface in a direction perpendicular to the longitudinal direction of the incident surface, the incident surface is partially or wholly formed by a cut surface.

In the light guide plate for the surface light source device according to the present invention, preferably, the cut surface is nearly symmetrically formed in the longitudinal direction with respect to an almost central portion of the incident portion in its longitudinal direction, and the cut portion is formed on a projecting portion parallel to the other portion of the incident surface. The dimension of the projection is set to be about 1 mm or less, preferably, 0.5 mm or less, and the surface roughness of the projection is set to be 50 μm or less, preferably, 20 μm or less in a unit of 10-point average roughness (Rz).

In addition, according to the method of manufacturing the light guide plate for the surface light source device according to the present invention, a gate is arranged at a designed position which is the nearly central position of the incident surface and overhangs or protrudes from the position parallel to the emission surface in the molding mold, and a cavity in which a molten material injected from the gate nearly symmetrically flows in the longitudinal direction of the incident surface is supplementarily formed, wherein the molten material is molded by said mold, and then the overhang portion (also referred to as protruding portion) molded by the supplementary cavity is cut to form a cut surface.

In the above manufacturing method, the gate is preferably formed as facing an extension of the emission surface or a surface parallel to the emission surface.

A light guide plate for the surface light source device according to the present invention is preferably manufactured by the following method. In a mold to be used, at a nearly central position of the incident surface of the light guide plate to be manufactured and distant from the incident surface by a designed dimension, the gate is arranged toward the same plane as that of the emission surface of the light guide plate or a plane parallel thereto and a supplementary cavity portion is formed such that a material injected from the gate symmetrically flows in the longitudinal direction of the incident surface.

Therefore, the material injected from the gate advances and spreads in the supplementary cavity as curving at 90° and the material flows into the cavity portion forming a thick portion near the incident surface at a nearly uniform pressure from an area larger than that of the gate. Thereafter, the material flows parallel from the thick portion to a distal thin portion to fill the cavity. For this reason, approximately even and regular flow and nearly uniform pressure can be obtained in the regions of the cavity. Thus incomplete filling and the formation of a weld line can be prevented, with the result that the shape of the rough reflection surface can be accurately transferred to the product.

After molding, the unnecessary portion molded by the supplementary cavity is cut off to manufacture a light guide plate. The cut surface is used without changing its state and need not be subjected to specular finish.

BRIEF DESCRIPTION OF THE DRAWINGS

FIG. 7 is a side view showing a light guide plate having a shape different from that of the light guide plate according to the embodiment shown in FIG. 1 and so on;

DETAILED DESCRIPTION OF THE PREFERRED EMBODIMENT

Figure 1:
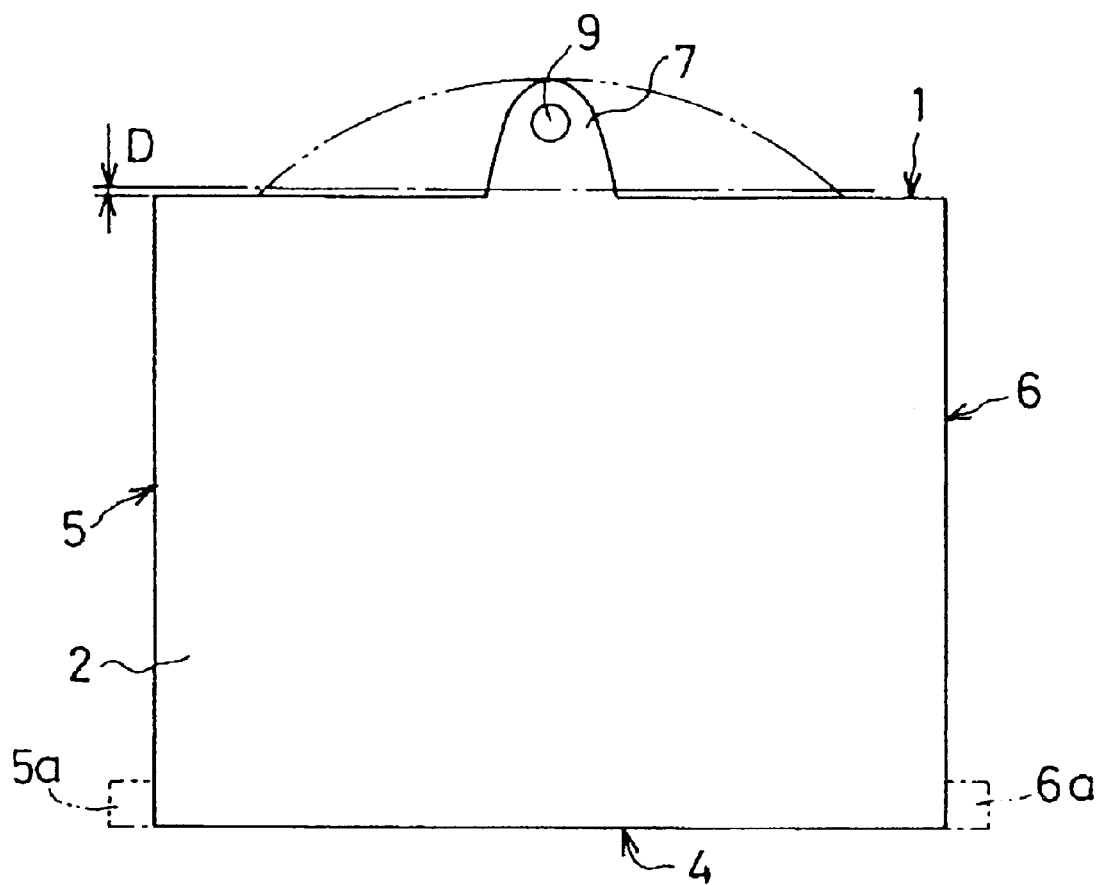
FIG. 1 is a plan view showing the semi-finish state of a light guide plate according to an embodiment of the present invention.
Figure 2:
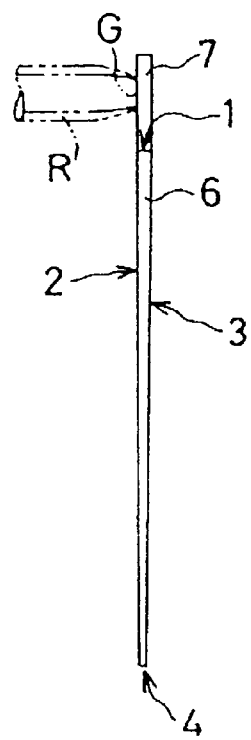
FIG. 2 is a right-side view showing the semi-finish state of the light guide plate shown in FIG. 1.
Figure 3:
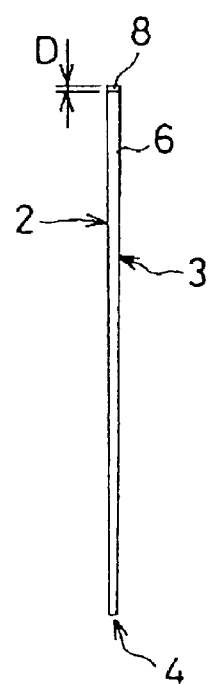
FIG. 3 is a right-side view showing the finish state of the light guide plate shown in FIG. 1.
Figure 4:
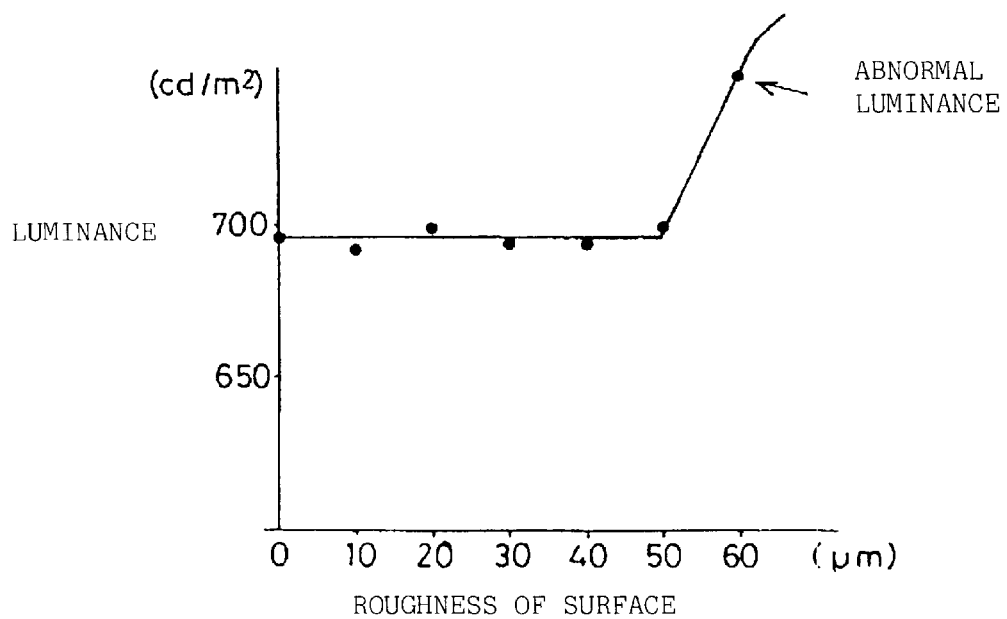
FIG. 4 is a graph showing the relationship between the surface roughness of the cut surface of the light guide plate and the luminance of an emission surface.

A preferred embodiment of the present invention will be described below with reference to FIGS. 1 to 4. FIG. 1 is a plan view showing a light guide plate in a state in which the material of the runner portion is removed after molding; FIG. 2 is a right-side view of FIG. 1; and FIG. 3 is a right-side view showing the light guide plate in a finish state in which the unnecessary portion is cut off. FIG. 4 is a graph showing the relationship between the surface roughness of the cut surface and luminance. In all of the drawings, the same reference numerals denote the same parts in.

Figure 9:
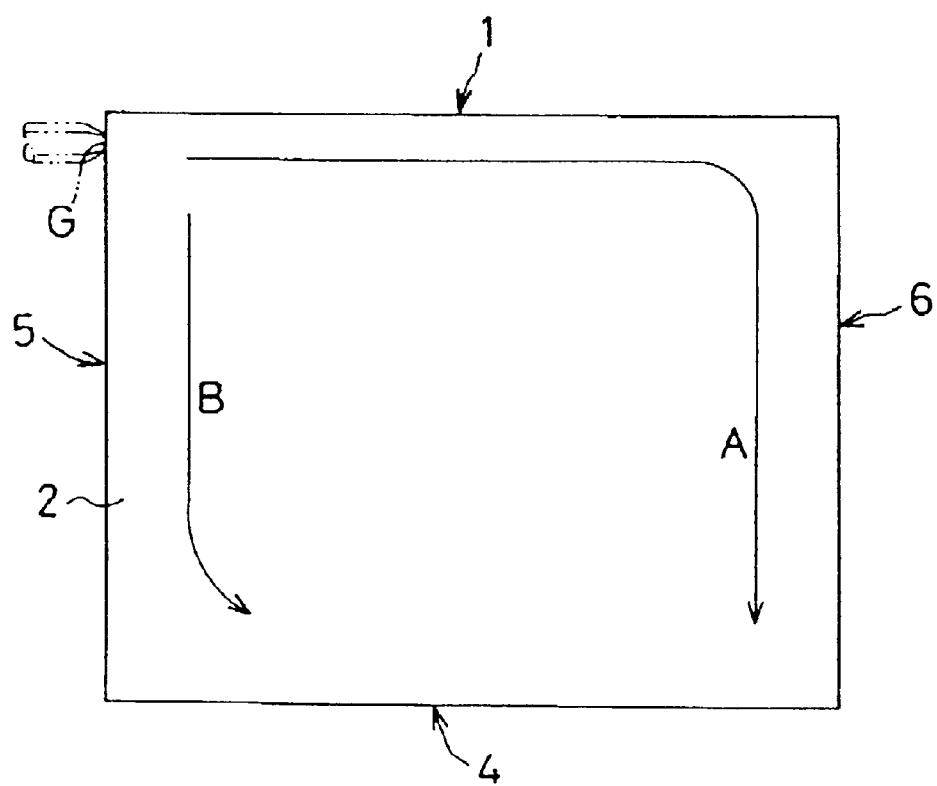
FIG. 9 is a plan view for explaining a prior art with respect to a case wherein an ultra-thin light guide plate similar to that of the embodiment shown in FIG. 1 and the like is molded.
Figure 10:
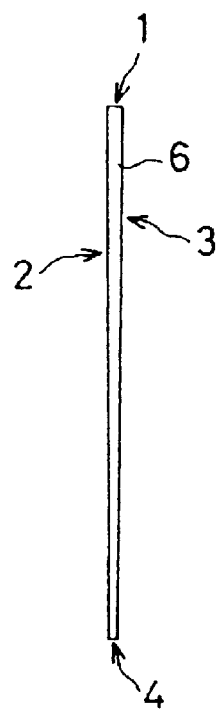
FIG. 10 is a right-side view for explaining a prior art with respect to a case wherein an ultra-thin light guide plate similar to that of the embodiment shown in FIG. 1 and the like is molded, similarly as in FIG. 9.

The light guide plate for the surface light source device according to this embodiment is similar to the ultra-thin light guide plate as described in FIGS. 9 and 10. This light guide plate has the following shape. That is, referring to FIG. 1, an overhang portion 7 is cut at a position distant from an incident surface 1 by a designed dimension D, and this cut surface is also used as an incident surface for source light. As is apparent from FIG. 3, the remaining portion of the overhang portion 7 after the cutting is formed as a projecting portion 8 having a thickness equal to that of the thick portion, and the cut surface is formed as a surface parallel to the other portion of the incident surface.

Referring to FIGS. 2 and 3, although a reflecting surface 3 is shown as a flat surface, the reflecting surface 3 really has a fine uneven shape. The reflecting surface 3 is designed to reflect source light incident from the incident surface in many directions and to cause the emission surface 2 to finally emit uniform light. Although various improved shapes are proposed as the uneven shape, descriptions thereof are omitted here. Referring to FIG. 1, a gate mark 9 is formed in the overhang portion 7. As is apparent from this, a gate G in the mold is arranged as to face one surface of the overhang portion 7, i.e., the same plane as that of the emission surface 2.

Therefore, the material supplied from a runner R is injected from the gate G into a cavity and then the course of the material is bent at about 90°.

As described above, an ultra-thin light guide plate is used in this embodiment and the size of the light guide plate will be described below. Referring to FIG. 1, the lengths of the incident surface 1 and the lower surface 4 are 180 mm respectively, and the lengths of side surfaces 5 and 6 are 143 mm respectively. Referring to FIG. 3, the thick portion has a thickness of 3.5 mm, and the thin portion has a thickness of 1.5 mm. The projecting dimension D of the projecting portion 8 is 0.3 mm. A distance between the center of the gate mark 9 and the incident surface 1 is 18 mm.

A method of manufacturing the light guide plate by injection molding will be described below. The manufacturing method is to be described with reference to a mold structure, as a matter of course. However, a complex drawing is omitted here and the semi-finish state of the light guide plate shown in FIGS. 1 and 2 will be compared to a molding cavity for the sake of descriptive convenience. Therefore, the cavity for forming the overhang portion 7 is called a supplementary cavity because the overhang portion 7 is cut off after molding as described above.

In molding, referring to FIG. 2, the acrylic-resin-based molten material injected from the gate G through the runner R advances in the supplementary cavity as curving 90°. Since the supplementary cavity has a width which increases along the direction of the advance, the material flows into the cavity near the incident surface from an area larger than that of the gate G at a uniform pressure. Thereafter, although the molten material laterally spreads in the form of a fan, the molten material, as a whole, flows from the thick portion on the incident surface side to the thin portion on the lower side portion. Although the direction of the flow is not exactly parallel, the molten material flows at the degree of parallelization considerably higher than that of the prior art described in FIG. 9, at a uniform pressure.

In this manner, according to this embodiment, although the ultra-thin light guide plate is made, the material regularly flows in the regions in the cavity by an ordinary molding machine under ordinary pressure control and temperature control to fill the cavity and corners thereof completely. In addition, the uneven shape formed on the reflecting surface can be well transferred, no weld line is formed and warping is avoided in spite of the ultra-thin light guide plate.

In this embodiment, attention must be paid to that the flowing portion from the supplementary cavity to the thick portion has a length which is about $\frac{1}{7}$ the length of the incident surface 1. In order to obtain a further well material flow, the ratio of the length of the flowing portion to the length of the incident surface 1 may be increased, and the supplementary cavity may be formed as indicated exemplary by a two-dot chain line in FIG. 1. In this case, as in another case described later, the uniformity of light emitted from the emission surface has no abnormality.

Figure 5:
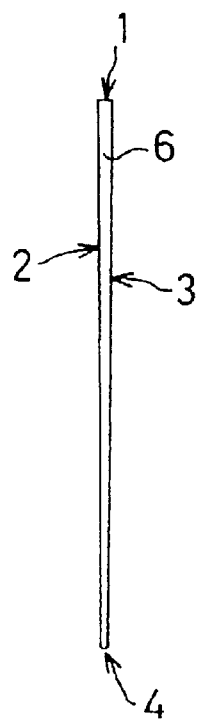
FIG. 5 is a right-side view showing the finish state of the light guide plate in FIG. 3 in which an overhang portion 7 in FIG. 1 is completely cut off.

After the semi-finish structure is molded, the overhang portion 7 is cut. This cutting may be performed by using various cutters including a diamond cutter. In this embodiment, the cutting was performed by a conventional cutter having a rotary blade for cutting an acrylic material. Referring to FIG. 5, it is ideal that this cut surface is on the same plane as that of the incident surface 1. However, in consideration of mass production, the cutting is performed at a position distant from the incident surface 1 by 0.3 mm.

In the light guide plate manufactured as described above, the incident surface portion, other than the cut surface, is formed as a specular surface. Therefore, it must be examined whether the presence of the projecting portion 8 and the roughness of the cut surface prevent the emission surface 2 from emitting light having a uniform distribution. Thus, the examination result is described below.

A light guide plate having the above size and a cut surface having a surface roughness of 10 $\mu$m in unit of 10-point average roughness (Rz) and a light guide plate having the above size and a cut surface having a surface roughness of 60 $\mu$m in the unit were prepared. The luminance (cd/m$^2$) of light emitted from emission surfaces were measured, and the luminance are compared with a measurement value for the specular surface obtained by polishing the cut surface. The results are shown in the following table. In this measurement, a cold cathode tube having a diameter of 3 mm and a tube surface luminance of 13,700 cd/m$^2$ was arranged 1 mm distant from the incident surface 1 in the longitudinal direction of the incident surface 1. A lamp holder having an inner surface of a silver reflecting side opposite to the incident surface opposing the surface with respect to the cold cathode tube. In addition, a sheet having a front surface on which a silver reflecting surface was formed was arranged along the rear side of the reflecting surface 3 of the light guide plate such that the silver reflecting surface was almost parallel to the reflecting surface 3 of the light guide plate. Three positions located near the central portion of the incident surface and distant from the incident surface toward the lower surface 4 were set, respectively.

TABLE

| Surface Roughness | Measurement Position | | |
|---|---|---|---|
| (Rz) | 10 mm | 71 mm | 132 mm |
| 10 μm | 691 | 972 | 681 |
| 60 μm | 748 | 633 | 593 |
| Specular Surface | 696 | 699 | 672 |

According to the above measurement results, it was clarified that luminance uniformity was considerably degraded at a surface roughness of 60 μm, and that the luminance uniformity at a surface roughness of 10 μm was almost equal to the luminance uniformity obtained by performing specular finish. It was also clarified that the measurement result obtained by performing the specular finish was not influenced by the presence of the projecting portion.

Since the above results were obtained, cut surfaces having four surface roughnesses of 20 μm, 30 μm, 40 μm, and 50 μm were prepared to measure luminance at the position of 10 mm where abnormal issue occurred at the surface roughness of 60 μm. FIG. 4 is a graph on which measurement results obtained by a total of 7 cut surfaces are plotted.

As a result, it was clarified that the surface roughness of the cut surface was set to be 50 μm without any problem in the light guide plate having the size of this embodiment. When measurement was performed such that the projecting dimension (D) of the projecting portion 8 in the light guide plate having a cut surface having a surface roughness of 50 μm was set to be 1 mm, the almost same result as described above could be obtained. For this reason, it was estimated that the projecting dimension could be further increased without any problem. However, when the projecting dimension was excessively large, the fluorescent tube should be away from the incident surface by a distance corresponding to the excessive dimension, thereby increasing a surface light source device in size. Therefore, in consideration of manufacturing efficiency, the projecting dimension is preferably set to be about 1 mm or less.

In the above embodiment, as shown in FIG. 2, it should be noted that the gate G faces the plane extending from the emission surface 2. One reason why this arrangement is employed is that the following point is considered. That is, as is apparent from the size of the gate mark 9 shown in FIG. 1, the size of the gate G of the ultra-thin light guide plate can be determined regardless of the thickness of the light guide plate. Another reason is that, when a material widely flows from the supplementary cavity to the thick portion, the pressure acting on the material can be advantageously averaged to some extent. However, the present invention is not limited to this arrangement, and the gate G may be or arranged downward in FIG. 2.

Figure 6:
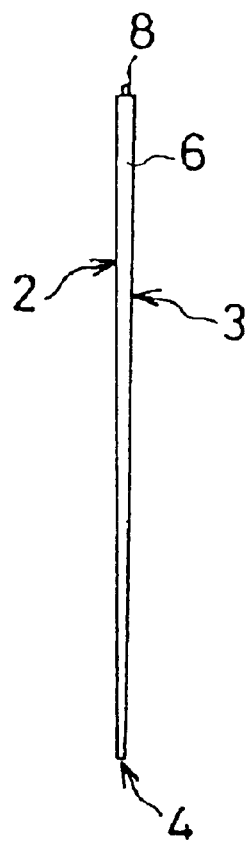
FIG. 6 is a right-side view similar to FIG. 3 showing the finish state of the light guide plate in which the shape of a projecting portion 8 is modified.

In addition, the thickness of the projecting portion 8 (i.e., the thickness of the overhang portion 7) need not be equal to the thickness of the thick portion as shown in FIG. 3. As shown in FIG. 6, the thickness may be decreased and the cut surface may be formed on a portion of the incident surface with respect to the latitudinal direction. In addition, the whole incident surface may be formed as a cut surface. In this case, the luminance slightly decreases as a whole, and material loss caused by cutting off the overhang portion increases. For this reason, in the light guide plate having the size described in the above embodiment, the thickness of the projecting portion 8 is preferably set to be 25 to 35 mm with respect to the longitudinal dimension of the incident surface, i.e., 180 mm.

The position of the cut surface or the gate position is ideally located just at the central portion of the light guide plate in the lateral direction as shown in FIG. 1. However, if the position is laterally moved to some extent, the uniformity of outgoing light is rarely influenced.

In addition, in the present invention, as shown in FIG. 1, overhang portions 5a and 6a each having a proper thickness may be arranged on the side surfaces 5 and 6, respectively. The overhang portions 5a and 6a are generally used to position the light guide plate when the light guide plate is incorporated in the surface light source device. In the light guide plate manufactured by the conventional method shown in FIG. 9, there is trouble in filling the material into the thin portion. For this reason, when the overhang portions 5a and 6a are to be arranged near the thin portion, the shape of the thin portion is not desirably transferred, with the result that the distribution of outgoing light in the thin portion cannot be made uniform.

However, according to the present invention, the above problem can be solved. In this case, the reason why the overhang portions 5a and 6a are desirably arranged near the thin portion of the light guide plate is described below with reference to experiment data.

The following table shows results obtained by measuring luminance distribution on the emission surfaces of an 8-inch (133.6 mm×175.5 mm) light guide plate having thicknesses of 3 mm on the incident surface and 1 mm on the lower surface and a 9-inch (160 mm×220 mm) light guide plate having thicknesses of 3 mm on the incident surface and 1 mm on the lower surface.

A case wherein the overhang portions 5a and 6a are arranged at the upper end positions of the side surfaces 5 and 6 is represented by A; another case wherein the overhang portions 5a and 6a are arranged at positions which is ⅓ the distance between the incident surface 1 and the lower surface 4 apart from the incident surface 1 is represented by B, and the other case wherein the overhang portions 5a and 6a are arranged at the lower end positions is represented by C. In addition, measurement positions are defined as follows.

On the emission surface 2, [1], [2] and [3] are laterally aligned at a position 10 mm distant from the incident surface 1, [4], [5] and [6] are laterally aligned at an intermediate position between the incident surface 1 and the lower surface 4, and [7], [8] and [9] are laterally aligned at a position 10 mm distant from the lower surface 4. At the same time, the following conditions are satisfied. That is, [1], [4] and [7] are vertically aligned at a position 10 mm distant from the side surface 5, [2], [5] and [8] are vertically aligned at an intermediate position between the side surfaces 5 and 6, and [3], [6] and [9] are vertically aligned at a position 10 mm distant from the side surface 6.

In this case, the surface roughness of the cut surface of the overhang portion 7 is 10 μm in a unit of 10-point average roughness (Rz). The tube surface luminance of the cold cathode tube is 19,500 cd/m² when the 8-inch light guide plate is used, and is 23,900 cd/m² when the 9-inch light guide plate is used. Other experiment conditions are the same as those described in the above example.

TABLE

In Case of 8 Inches (cd/m²)

| Position of Over- hang Portion | Measurement Position | | | | | | | | |
|---|---|---|---|---|---|---|---|---|---|
| | [1] | [2] | [3] | [4] | [5] | [6] | [7] | [5] | [9] |
| A | 964 | 1078 | 980 | 1060 | 1100 | 1065 | 1090 | 1080 | 1085 |
| B | 995 | 1678 | 1020 | 1055 | 1100 | 1058 | 1060 | 1080 | 1065 |
| C | 1040 | 1078 | 1050 | 1050 | 1100 | 1055 | 1038 | 1080 | 1035 |

TABLE

In Case of 9 Inches (cd/m²)

| Position of Over- hang Portion | Measurement Position | | | | | | | | |
|---|---|---|---|---|---|---|---|---|---|
| | [1] | [2] | [3] | [4] | [5] | [6] | [7] | [5] | [9] |
| A | 1030 | 1127 | 1035 | 1150 | 1150 | 1148 | 1165 | 1130 | 1170 |
| B | 1060 | 1127 | 1075 | 1142 | 1150 | 1145 | 1100 | 1130 | 1110 |
| C | 1110 | 1127 | 1116 | 1135 | 1150 | 1138 | 1115 | 1130 | 1120 |

As is apparent from the above two tables, when the overhang portions 5a and 6a are closer to the incident surface 1, the luminance at positions near both the ends ([1] and [3]) near the incident surface 1 much decrease. Therefore, in consideration of the uniformity of the luminance distribution on the emission surface 2, the overhang portions 5a and 6a are preferably arranged at positions distant from the incident surface 1 and located on the side of lower surface 4 with respect to at least the intermediate position between the incident surface 1 and the lower surface 4, i.e., positions near the thin portion.

According to the present invention, assume that a mold having a structure in which a molten material injected from the gate flows from the incident surface 1 to the lower surface 4 is used. In this case, when the overhang portions 5a and 6a are arranged on the side of lower surface 4 with respect to the intermediate position between the incident surface 1 and the lower surface 4, the overhang portions 5a and 6a having good shape transferring characteristic and a high shape accuracy can be easily formed. When the shape accuracy of the overhang portions 5a and 6a is high as described above, an accuracy in positioning the light guide plate can be increased.

The relationships between positions (A, B, C) of the overhang portions 5a and 6a with respect to the incident surface 1 and the decrease in luminance near both the ends near the incident surface 1 are the same as those obtained for a light guide plate having a uniform thickness from the incident surface 1 to the lower surface 4. For this reason, also in this case, the mold preferably has the structure in which the molten material injected from the gate flows from the incident surface 1 to the lower surface 4 and the overhang portions 5a, 6a are desirably arranged on the side of lower surface 4 with respect to the intermediate position between the incident surface 1 and the lower surface 4. Although the overhang portions 5a and 6a are arranged on the side surfaces 5 and 6 in FIG. 1, the overhang portions 5a and 6a may be arranged on the emission surface 2, the reflecting surface 3, or the lower surface 4 depending on the situation.

Figure 7:
Figure 8:
FIG. 8 is a side view showing a light guide plate having a shape further different from the light guide plate according to the embodiment shown in FIG. 1 and the like and the light guide plate shown in FIG. 7.
Figure 11:
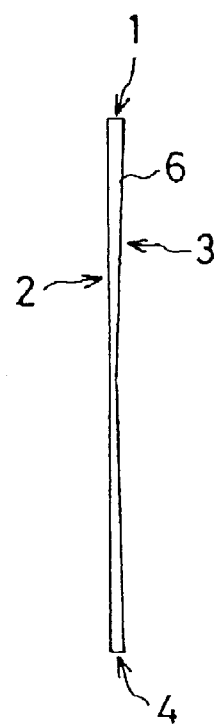
FIG. 11 is a side view showing an ultra-thin light guide plate having the shape illustrated in FIG. 9.

In addition, the shape of a light guide plate to which the present invention can be applied is not limited to the shape of the light guide plate described in this embodiment as a matter of course. More specifically, the present invention can be applied to the light guide plates having the shapes described in the above-mentioned known publications and the light guide plates having the shapes shown in FIGS. 7, 8 or 11. When the light guide plate having the shape shown in FIG. 11 is used, it should be noted that two upper and lower incident surfaces are formed.

In this case, when a mold structure is designed such that the molten material flows from one incident surface to the other incident surface, the material flows almost in the same manner as the embodiment shown in FIG. 1 while a gradual changing from a fan shape flow pattern with some extent into a parallel flow pattern is caused until it reaches the central position in the flow direction, i.e. the thin portion. Passing through the central position, a fan-like flow pattern tends to appear again because of the increasing thickness.

However, in general, this tendency is very weak, with the result that filling is completely realized substantially in the same manner as the embodiment shown in FIG. 1, with the parallel flow pattern kept.

It will be understood easily from the above detailed description that the present invention provides light guide plates for a surface light source device, including ones of ultra-thin types, which are not subject to incomplete filling in the cavity of the used mold, incomplete transferring of unevenness of various shapes and generation of weld line or warping, and further which enable uniform light emission.

What is claimed is:

1. A light guide plate for a surface light source device, manufactured by injection molding, comprising:
   an incident surface in a longitudinal direction of a slender light source; and
   an emission surface for emitting incident light received at said incident surface, in a direction perpendicular to the longitudinal direction of said incident surface,
   said light guide plate being large in thickness at a position near said incident surface and decreasing in thickness with increasing distance from the incident surface,
   wherein said incident surface is partially or entirely formed as a cut surface which remains after cutting a protruding portion from the light guide plate, the protruding portion having a supplemental cavity around an injection molding gate.

2. A plate according to claim 1, wherein said cut surface is symmetrically formed with respect to an nearly central portion of said incident surface in the longitudinal direction.

3. A plate according to claim 1 or 2, wherein said cut surface is formed at a portion of said incident surface in a latitudinal direction.

4. A plate according to claim 1, wherein said cut surface projects from another plane of said incident surface.

5. A light guide plate according to claim 2, wherein said cut surface projects from another plane corresponding to the other portion of said incident surface.

6. A light guide plate according to claim 3, wherein said cut surface projects from another plane corresponding to the other portion of said incident surface.

7. A light guide plate according to claim 4 or 5, wherein said cut surface projects so that said cut surface is parallel to another plane corresponding to the other portion of said incident surface, the projecting distance of said projection being not greater than about 1 mm, and said cut surface having a surface roughness of not greater than about 50 μm in terms of 10-point average roughness (Rz).

8. A light guide plate according to claim 6, wherein said cut surface projects so that said cut surface is parallel to another plane corresponding to the other portion of said incident surface, the projecting distance of said projection being not greater than about 1 mm, and said cut surface having a surface roughness of not greater than about 50 μm in terms of 10-point average roughness (Rz).

9. A light guide plate according to claims 1, 2, 4 or 5, wherein said light guide is provided with a protruding portion which has a location distant from said incident surface and functions for positioning said light guide plate when being assembled.

10. A light guide plate according to claim 3, wherein said light guide is provided with a protruding portion which has a location distant from said incident surface and functions for positioning said light guide plate when being assembled.

11. A light guide plate according to claim 6, wherein said light guide is provided with a protruding portion which has a location distant from said incident surface and functions for positioning said light guide plate when being assembled.

12. A method of manufacturing a light guide plate for a surface light source device which comprises an incident surface in a longitudinal direction of a slender light source and an emission surface for emitting incident light received at said incident surface in a direction perpendicular to the longitudinal direction of said incidence surface, said light guide plate being large in thickness at a position near said incident surface and decreasing in thickness with increasing distance from the incident surface, the method comprising the steps of:
(a) providing a mold with a gate arranged at a position separated from a desired position of the incident surface, the gate being separated along a plane of the emission surface, the mold being further provided with an additional cavity to guide molten material from said gate to the desired position of the incident surface;
(b) injecting molten material into the mold through the gate to form a guide plate portion and a protruding portion, the guide plate portion connecting to the protruding portion in a vicinity of the desired position of the incident surface; and
(c) cutting the guide plate portion from the protruding portion in the vicinity of the desired position of the incident surface, the cutting operation providing a cut surface on the guide plate portion, the cut surface serving as at least a portion of the light incident surface.

13. A method of manufacturing a light guide plate according to claim 12, wherein said gate faces an extension plane of the emission surface or a plane parallel with the emission surface.

14. A light guide preform comprising:
a guide plate portion and a protruding portion, the guide plate portion connecting to the protruding portion in a vicinity of a desired position of a light incident surface, the guide plate portion having a thickness direction and a light emission surface, the light emission surface being arranged perpendicular to the thickness direction, the guide plate portion having a thickness which decreases with increasing distance from the desired position of the incident surface, and
the protruding portion being separated from the desired position of the incident surface, in a direction extending away from the guide plate portion along a plane encompassing the light emission surface, the protruding portion have a thickness sufficient to allow uniform flow of a molten injection molding material therethrough.

* * * * *